United States Patent [19]
Garcia

[11] Patent Number: 6,119,787
[45] Date of Patent: Sep. 19, 2000

[54] AUGER PLANTING TOOL

[76] Inventor: Jaime Garcia, 710 E. Pitts, Houston, Tex. 77506

[21] Appl. No.: 09/220,410

[22] Filed: Dec. 24, 1998

[51] Int. Cl.[7] .................................................. A01B 33/06
[52] U.S. Cl. .............................................................. 172/25
[58] Field of Search ............................. 111/116; 172/25, 172/111, 519, 19, 21, 22; 175/394, 335, 385, 386, 387; 294/50.6; 408/204, 206

[56] References Cited

U.S. PATENT DOCUMENTS

| | | | |
|---|---|---|---|
| 542,584 | 7/1895 | Carter | 172/25 |
| 1,340,927 | 5/1920 | Whitman | 172/25 X |
| 4,807,710 | 2/1989 | Greeley | 175/394 |
| 4,901,800 | 2/1990 | Wilson | 172/25 |
| 4,986,368 | 1/1991 | Underwood et al. | 172/25 X |
| 5,133,269 | 7/1992 | Charneski | 172/25 X |
| 5,865,259 | 2/1999 | Catto | 172/25 |

*Primary Examiner*—Robert E. Pezzuto
*Attorney, Agent, or Firm*—Harrison & Egbert

[57] ABSTRACT

An auger planting tool for boring holes in yards and the like, wherein plants and the like may be conveniently implanted into the soil, is attached to a rotating drive device such as a drill or a Weed-Eater type cutting and drill. By triggering the rotating drive device, the auger tool is driven to the intended depth beneath the soil. A detent ring controls the penetration of the auger tool into the soil. An auger spiral flange simultaneously provides a cutting and screwing action attributable to the spiral configuration thereof. The auger spiral flange is fixedly attached to a shaft, and includes plurality of cutting blades and a plurality of contiguous spiral surfaces. These cutting blades forcibly dig into and through the soil bed. An alignment and guide member promotes keeping this downward driving action in a substantially vertical orientation. A churning action caused by the rotating spiral configuration agitates the soil that has been separated from the ground and enables the spiral surface to communicate the loosened soil toward the surface by emulating an upwards conveying action.

5 Claims, 3 Drawing Sheets

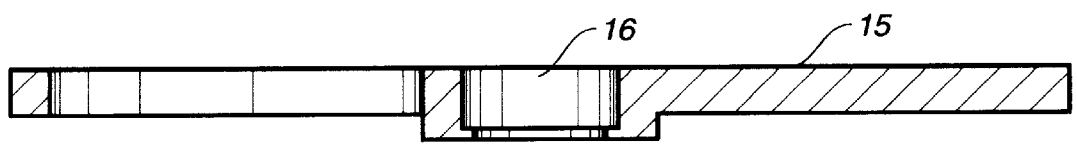
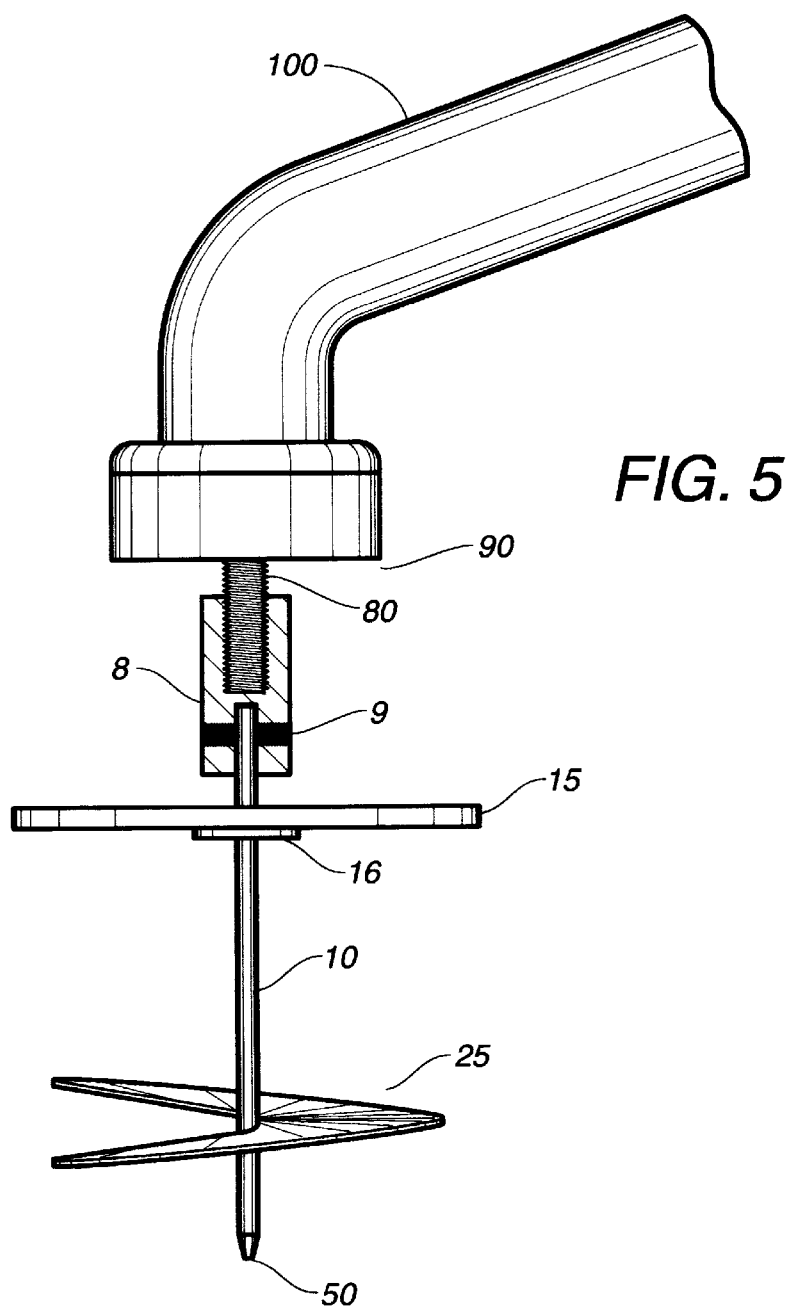

AUGER PLANTING TOOL

BACKGROUND OF THE INVENTION

The present invention relates to auger tools, and more particularly relates to the use of auger tools for planting and the like.

Auger tools have been widely used in the art primarily for boring holes suitable for wells and the like. For example, Morgan, in U.S. Pat. No. 147,857, discloses a well boring apparatus with a spiral-flanged auger arranged to be operated by a sweep or other suitable device. This apparatus includes a stop plate independent of the auger cutting blades for boring holes to a limited depth. Similarly, in U.S. Pat. No. 3,081,635, Bowers teaches a boring tool, designed for taking tree samples, that enables removal of chips independently of the boring action caused by spiral cutting elements. Thus, chips are removed by cutting head elements and then passed back by spiral elements. Either a hand-wheel or a power means may be used to drive the spiral action. French Patent No. 1,480,255 shows a basic auger that is designed to be hand-driven.

There have been several improvements in the art to control the boring depth obtained with auger means. Pierce, in U.S. Pat. No. 183,467, discloses an earth auger for boring wells having a hollow shaft with two spiral flanges at the auger's lower end and one continuing toward the upper end. An encasing cylinder is adjustable at its open end via an adjustable collar. The pair of oppositely disposed spiral flanges cause sand and the like to ascend within the shaft, while being retained within the cylinder. A series of valves between the lower flanges hold and retain the entrained sand. Sandlin, in U.S. Pat. No. 152,522, teaches an earth auger for boring wells through quicksand. Using a spirally-flanged auger with a screw-pivot and exchangeable bit, wells of varying diameters may be bored. Two disk-shaped collars are fixedly attached to the shaft above the auger, for guiding the bore in the surrounding casing. Glass, in U.S. Pat. No. 204,025, also discloses a well auger having a hollow sleeve passing through a cylindrical casing. This auger has a disk at the upper end of the casing secured to the sleeve, and a worm secured at the lower end of the casing fitted with a hinged drop-valve for allowing sand to pass upwardly and simultaneously preventing the sand from escaping downwardly.

Notwithstanding this old art pertaining to boring holes for wells and the like, there appears to be no simple apparatus for boring holes for enabling implanting of plants and the like, while simultaneously assuring that soil removal is conveniently and routinely accomplished. Accordingly, these limitations and disadvantages of the prior art are overcome with the present invention, and improved means and techniques are provided that are useful for implanting plants and the like.

SUMMARY OF THE INVENTION

The preferred embodiment of the present invention provides an auger planting tool for boring holes in yards and the like, wherein plants and the like may be conveniently implanted into the soil. According to the present invention, a specially designed auger tool is attached to a rotating drive device such as a drill means or a Weed-Eater type cutting and drill means, and vertically disposed at the designated location where a plant or the like is to be implanted into soil and the like. By triggering the rotating drive means, the auger tool is driven to the intended depth beneath the soil. As will be understood by those skilled in the art, a detent means controls the penetration of the auger tool into the soil.

It is also within the concept of the present invention, that the auger tool taught herein is adapted to be releasably attached to and driven by a hand-operated power drill, Weed-Eater type device or the like, or a manually-operated handle means and the like. Depending upon such factors as soil condition, location and size of area in which to bore holes, size of the holes required for implanting, suitable mechanical means may be selected to provide advantageous boring for implanting plants and the like in the soil and the like.

It is accordingly an object of the present invention to provide an auger tool for boring holes for implanting plants and the like.

It is an object of the present invention to provide an auger tool that removes soil, dirt, and the like at a rate and in an amount that promotes continuous operation and that inherently avoids back-filling, It is an object of the present invention to provide an auger tool that bores holes for planting and the like, while enabling soil and the like to be freely extracted.

It is still another object of the present invention to provide an auger tool that bores holes for planting and the like, while facilitating the removal of soil and the like in a soft and manageable condition.

These and other objects and features of the present invention will become apparent from the following detailed description, wherein reference is made to illustrative examples and to the figures in the accompanying drawings.

IN THE DRAWINGS

FIG. 4 depicts a partial cut-away front view of a portion of the embodiment depicted in FIG. 1.

FIG. 5 depicts a simplified front view of the embodiment depicted in FIG. 3 attached to a powered rotational device.

DETAILED DESCRIPTION

Figure 1:
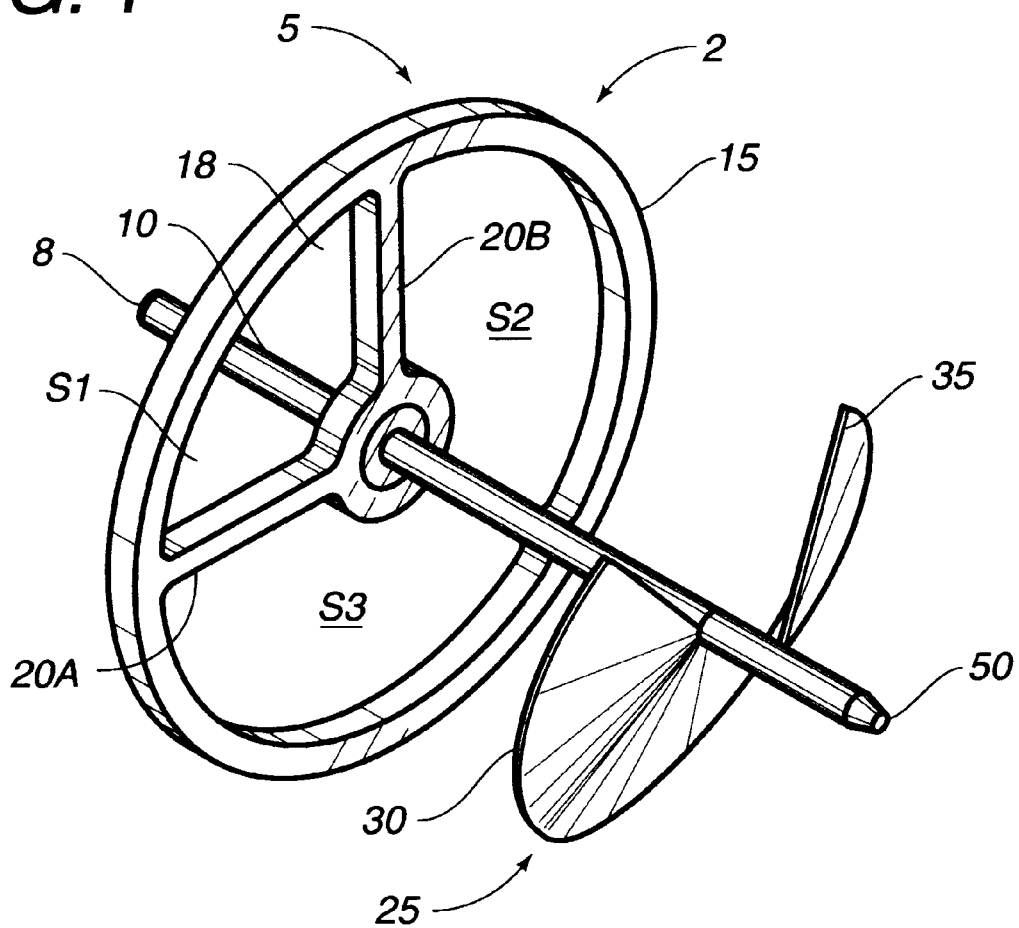
FIG. 1 depicts a frontal perspective view of the preferred embodiment of the present invention.

Referring to FIGS. 1–5 collectively, there is depicted the preferred embodiment of the present invention. Referring specifically to FIG. 1, there is depicted auger planting tool 2 comprising depth control means 5 rotationally attached to cylindrical shaft means 10 and spirally-flanged cutting means 25 fixedly attached to an elongated cylindrical shaft means 10. Disposed at remote, open end of auger shaft means 10 is auger alignment and guide means 50.

It will be appreciated that, in a manner generally known in the art, auger spiral flange means 25 simultaneously provides a cutting and screwing action attributable to the spiral configuration thereof. More particularly, auger spiral flange means 25 is fixedly attached to shaft means 10, and includes plurality of cutting means 27 and plurality of contiguous spiral surfaces 28. As will be understood by those skilled in the art, plurality of cutting means 27 comprises edge means 30 and 35, respectively, which in combination functions as cutting blade means that forcibly digs through the soil as will be hereinafter described. Spiral surface 28 is disposed between transverse edge means 30 and transverse edge means 35.

According to the present invention, under the power of a rotating drive means provided by a Weed-Eater type device, a power drill device, or the like, shaft means 10 is caused to rotate, thereby driving attached spiral flange means 25 downwardly into and through the soil. Alignment and guide means 50 promotes keeping this downward driving action in a substantially vertical orientation. As will be appreciated by those skilled in the art, this driving action causes auger tool 2 to penetrate the soil with cutting blade means 30 and 35 by digging into and churning through the soil, and simultaneously boring a suitably sized hole therein. Such churning action, of course, agitates the soil that has been separated from the ground, and enables spiral surface 28 to communicate the loosened soil toward the surface by emulating an upwards conveying action.

Figure 2:
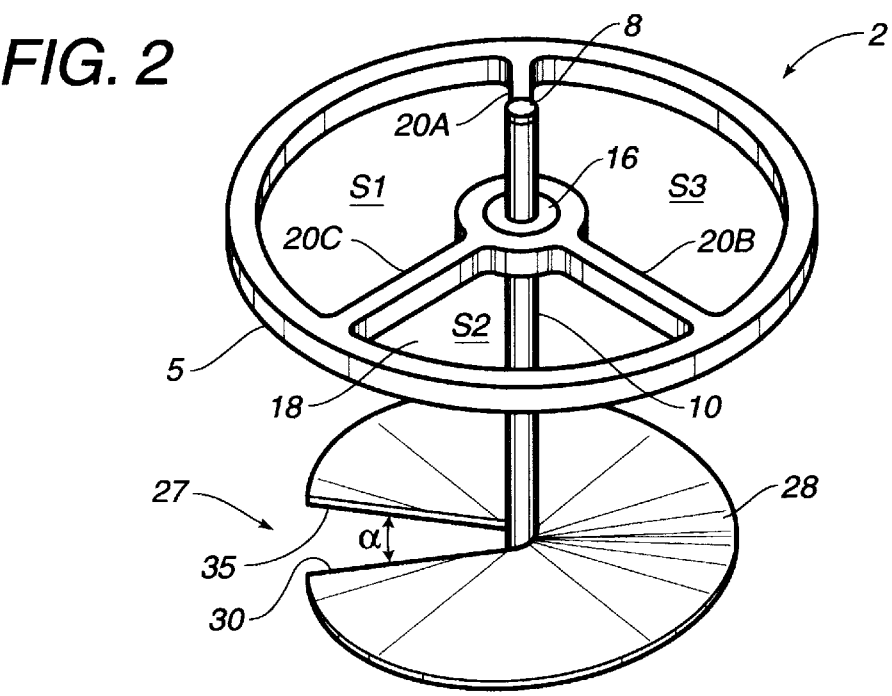
FIG. 2 depicts a top view of the embodiment depicted in FIG. 1.
Figure 3:
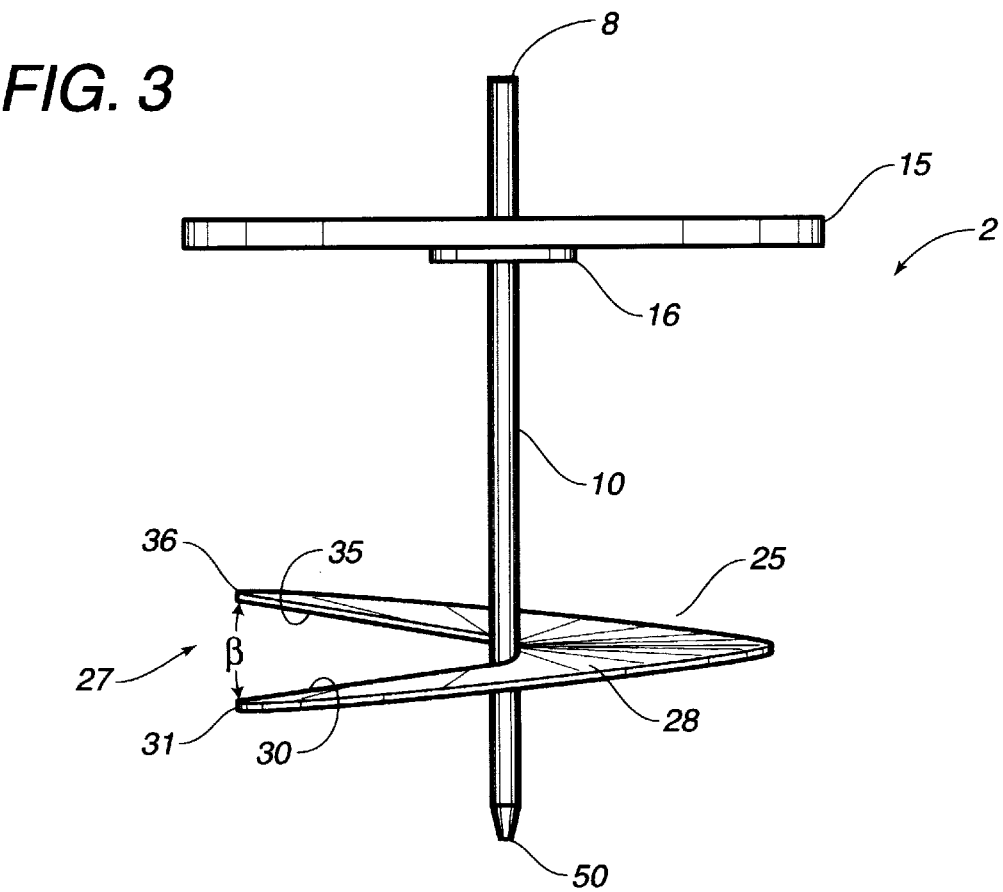
FIG. 3 depicts a front view of the embodiment depicted in FIG. 1.

It has been found that by suitably configuring the physical relationship between shaft means 10 and plurality of cutting edge means 27, uninterrupted, continuous, and convenient soil extraction contemplated by the present invention may be attained. It will be understood that it is advantageous to attach each of cutting blade means 30 and 35 to shaft means 10 such that an arcuate relationship exists therebetween. As will be hereinafter described, this arcuate relationship, wherein, on the one hand, cutting blade means 30 and 35 constitute opposite sides of an included angle, and, on the other hand, each of cutting blade means 30 and 35 constitute one side of included angles having shaft means 10 as the opposite side. Thus, referring now to FIGS. 1–3, this arcuate relationship may be readily seen. In particular, FIGS. 2 and 3 depict a the angle formed by cutting blade-means 30 and 35 described in a horizontal plane by a vertex V formed on surface 28. Also depicted is β the angle formed by the height differential between end 31 of cutting blade means 30 and end 36 of cutting blade means 35 described in a vertical plane by vertex V formed on surface 28.

As will be appreciated by those skilled in the art, it has been discovered that the configuration and curvature of the cutting blade means as contemplated hereunder—manifest as angles α and β—function as a compromise between speed of penetration into the ground and consequent boring therethrough, on the one hand, and churning action and consequent loosening of the soil, on the other hand. The present invention accommodates a broad range of a combination of angles α and β, with a suitable driving force provided by a rotating device contemplated hereunder. It will be understood that the displacement manifest by angle α is typically significantly greater than the displacement manifest by angle β. For example, under normal boring conditions, under the influence of a conventional Weed-Eater triming tool, for potted plants and the like, excellent results have been obtained using auger planting tool 2 having α in the range of 5–40° and β in the range of 0–30°. As another example, under like boring conditions, acceptable results have been obtained using embodiments having α in the range of 0–85° and β in the range of 5–70°. It will be appreciated that, for larger angles α, i.e., angles of at least 30°, and for concomitant larger angles β, i.e., angles of at least 5°, considerable drag or resistance to rotation occurs, so that greater rotational force must be provided by a suitably selected rotational device such as a Weed-Eater type device, a power drill, or even manual hand-operation. Otherwise, inadequate boring and churning are apt to be achieved, wherein productivity is obviously adversely affected and, indeed, an insufficiently sized bore may result. It should be clearly understood, however, that the present invention contemplates an auger tool constructed with cutting blades means having α in the obtuse angle range and β in the acute ange range with of an angle of even 85°. The present invention teaches a novel tool that enables planters and the like to easily achieve prerequisite soil extraction action: soil is separated from the ground and immediately conveyed to the surface in a finely-divided, soft state that promotes its return and integration with the ground—after a plant or the like has been implaced into the bore. The auger tool contemplated by the present invention is also constructed with depth control means 5 which preferably comprises ring support means 15 and plurality of spoke means 18 disposed perpendicularly of cylindrical shaft means 10, and just below adapter means 8. As will be readily understood by those skilled in the art, plurality of spoke means 18 comprises spoke means 20 A, B and C, respectively, which are preferably separated at 120° so as to be disposed at one-third points. It should be evident that this arrangement of spoke means uniformly distributes the load impressed upon ring means 15 by the soil and the like while being extracted from the ground and uplifted to the surface as hereinbefore described. Open spaces S1, S2, and S3 disposed between spoke means 20 A, B and C, of course, permit soil to be freely extracted from beneath the ground's surface as contemplated hereunder. Sealed bearing means 16 are preferably used to prevent entry of dirt, thereby assuring ease of rotational movement of ring means 15 about the perpendicular axis disposed along auger shaft 10. It will be appreciated by those skilled in the art that, under the influence of these sealed bearings disposed at the center thereof, ring or wheel means 15 is designed to catch up to the rotating spiral flanged auger means 25, thereby experiencing less resistance as boring and extraction proceeds.

As will be appreciated by those skilled in the art, an embodiment of the present invention configured with an auger flange diameter of about 4–4½ inches and a depth gage diameter of about 5½ inches, has been found to be particularly suited for,implanting plants contained within 2–4 inch flower pots and the like. Alignment and guide means 50 is preferably constructed from stainless steel that is relatively thin to engender less resistance to the upward flow of soil. Such embodiments of the present invention, constructed for use implanting contents of flower pots and the like, typically are constructed from stainless steel and aluminum, weighing about 4 ounces.

In particular, the shaft and spiral flanged auger means are preferably constructed from stainless steel, while the ring depth gage means is preferably constructed from aluminum. Notwithstanding, it will be appreciated that the ring depth gage of the present invention may also be constructed from suitable plastic materials such as an epoxy material capable of providing sufficient strength to penetrate hard ground and sufficient resistance to corrosion and other adverse elements. While boring a typical hole from implanting in a yard and the like consumes about three seconds, the present invention reduces this boring time to about one second. For boring a hole in hard soil and the like, a conventional hand-held shovel or the like might take 10–15 seconds to manually accomplish the digging operation; on the other hand, the present invention only takes about 3–5 seconds to create a suitably sized bore.

Of course, if a particular implanting task necessitates cutting through hard materials such as bark or the like, then an embodiment of the present invention adapted to be attached to a suitable power tool, such as a Weed-Eater type device, and operated in conjunction therewith, is appropriate. As shown specifically in FIGS. 4 and 5, this is achieved by replaceably attaching appropriate adapter means 8 to shaft means 10 and by constructing the auger tool to be commensurate with the task. Adapter means 8 includes receptacle means 7 configured to screwably receive thread means 80 disposed from remote end 90 of Weed-Eater device 100. In a manner well known in the art, rotational device 100 is secured to shaft means 10. In the preferred embodiment of the present invention, set screw means 9 secures Weed-Eater device thread means 9 to corresponding threaded receptacle 7 of adapter means 8. It should be understood that the adapter means contemplated by the present invention may be either male or female, depending upon the available joiner member contained on the selected rotational driving device.

Thus, using a power rotational device or the like, the present invention has been found to be particularly useful for planting "flats" or the like consisting of multiple rows of potted plants at high rates of speed and minimal labor heretofore unknown in the art. It will be understood that the present invention is also useful for implanting posts, telephone and utility poles, etc. The diameter of the hole needed will determine the size of the spiral flanged cutting means and corresponding depth gage means contained on the auger shaft. Those skilled in the art should understand that, while it is not necessary for the depth gage to move or rotate during the boring operation, it is preferable for such rotation to occur. Simultaneous rotation of the depth gage ring means assures that resistance on the auger tool is minimized, and that, when the tool bottoms-out, extra resistance does not occur. The present invention inherently avoids inadvertent dispensing of the extracted soil so that, after the plant or the like is placed in the bore, the extracted soil is immediately available for being re-inserted or returned to the ground. It will also be appreciated by those skilled in the art that the present invention routinely deals with a recurring problematic planting situation: implanting of bare-root plants such as roses. Using the present invention, virtually all of the extracted soil is immediately available for properly seating the bare-root plants so that optimal implanting is routinely attained.

Thus, the present invention extracts soil from beneath the ground, thereby boring a hole of suitable diameter and depth, by the downward screwing action of plurality of spirally flanged cutting blades. This downward screwing action causes implicated soil to be dug and churned, and then be extracted and conveyed to the ground surface by a corresponding screwing action. It will be understood that the present invention may be hand-operated by simply attaching a handle means to the adapter means configured to properly receive the handle means. Such a handle means would, of course, be manually rotated to drive the auger tool into the ground and extract soil at the intended rate. Regardless of the particular external driving force applied to the present invention, the simultaneous cutting and removal operations, limited by the penetration depth gage, is easily accomplished in a manner herein before unknown in the art.

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the present invention is to be measured by the scope of the appended claims herein.

What is claimed is:

1. On a surface ground location upon which a plant will be implanted into a hole in the soil, an auger planting tool comprising:

an elongated cylindrical shaft means configured to replaceably receive an adapter means at one end and an alignment and guide means at another, opposite end;

a plurality of spiral flange means fixedly attached to said shaft means;

each of said spiral flange means having a contiguous spiral surface with a first cutting means configured in an arcuate relationship with said shaft means and disposed at a transverse edge of said spiral surface, and with a second cutting means configured in an arcuate relationship with said shaft means and disposed at another, opposite transverse edge of said spiral surface;

each of said first cutting means is configured in an arcuate relationship with each of corresponding said second cutting means; and depth control means configured with a ring means having a plurality of spoke means for distributing load upon said plurality of spiral flange means and disposed perpendicularly and circumferentially of said shaft means, and medially of said adapter means and said plurality of spiral flange means for controlling penetration of said spiral flanged means into said ground while said hole is bored under downward cutting and churning action of said plurality of cutting means and while separated soil is extracted to said ground surface under upward conveying action of said spiral surfaces, by rotating independently of rotation of said plurality of spiral flange means about said shaft means.

2. The auger planting tool recited in claim 1, wherein said depth control means further comprises said ring means having said plurality of spoke means configured for evenly distributing load upon said plurality of spiral flange means.

3. The auger planting tool recited in claim 2, wherein said plurality of spoke means comprises three spokes disposed at 120° relative to the center of said ring means.

4. The auger planting tool recited in claim 1, wherein said ring means comprises sealed bearing means for enabling uninhibited rotational movement about said shaft means.

5. The auger planting tool recited in claim 1, wherein said adapter means is configured to receive a means for driving said bit means into said surface ground location.

* * * * *